United States Patent
Atkin et al.

(10) Patent No.: US 6,393,416 B1
(45) Date of Patent: May 21, 2002

(54) METHOD FOR ENTERING BIDIRECTIONAL AND DBCS LANGUAGES IN TIER-0 DEVICES

(75) Inventors: Steven Edward Atkin; Kenneth Borgendale; Michael Aaron Kaply, all of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/213,329

(22) Filed: Dec. 16, 1998

(51) Int. Cl.[7] .......................... G06F 17/30; G06F 15/16
(52) U.S. Cl. ........................ 707/4; 707/102; 709/216; 709/219
(58) Field of Search ............. 707/1–206; 709/216–219; 704/1–10; 345/864–866

(56) References Cited

U.S. PATENT DOCUMENTS

| | | | |
|---|---|---|---|
| 4,420,816 A | * 12/1983 | Yoshida | 364/900 |
| 4,831,526 A | 5/1989 | Luchs et al. | 705/4 |
| 4,939,689 A | 7/1990 | Davis et al. | 707/102 |
| 5,367,619 A | 11/1994 | Dipaolo et al. | 707/506 |
| 5,454,046 A | * 9/1995 | Carman, II | 382/186 |
| 5,640,577 A | 6/1997 | Scharmer | 707/507 |
| 5,644,653 A | * 7/1997 | Sunakawa et al. | 382/187 |
| 5,699,441 A | * 12/1997 | Sagawa et al. | 382/100 |
| 5,765,144 A | 6/1998 | Larche et al. | 705/38 |
| 5,948,040 A | 9/1999 | DeLorme et al. | 701/201 |
| 6,112,215 A | 8/2000 | Kaply | 707/507 |
| 6,154,214 A | * 11/2000 | Uyehara et al. | 345/358 |
| 6,181,344 B1 | * 1/2001 | Tarpenning et al. | 345/358 |
| 6,247,048 B1 | * 6/2001 | Greer et al. | 709/219 |
| 6,292,827 B1 | * 9/2001 | Raz | 709/217 |
| 6,298,303 B1 | * 9/2001 | Atkin et al. | 704/8 |

FOREIGN PATENT DOCUMENTS

JP 08137794 * 5/1996

* cited by examiner

Primary Examiner—Maria N. Von Buhr
(74) Attorney, Agent, or Firm—Jeffrey S. LaBaw; Bracewell & Patterson L.L.P.

(57) ABSTRACT

Complex languages such as bidirectional or double byte character set (e.g., Unicode) languages are supported in tier-0 devices despite the limited storage resources common for such devices. A phrase dictionary is built within a host data processing system which is capable of communicating with the tier-0 device and which supports complex language input. Commonly used text strings are added to the phrase dictionary utilizing any characters. The contents of the phrase dictionary are then transferred, along with sparse font information containing only the glyphs necessary for characters within the phrase dictionary, to the tier-0 device. Since font information for only a subset of all possible characters is stored in the tier-0 device, a much smaller amount of storage resources are consumed. On the tier-0 device, the phrase dictionary is invoked by a user control such as a pop-up, and the desired phrase may then be selected for entry into a data entry field. Additional phrases may be added as needed to the phrase dictionary on the host system and the phrase dictionary within the tier-0 device updated to add the new contents and associated sparse font information, if necessary. Multilingual support is therefore enabled in the tier-0 device with minimal consumption of resources.

20 Claims, 4 Drawing Sheets

METHOD FOR ENTERING BIDIRECTIONAL AND DBCS LANGUAGES IN TIER-0 DEVICES

RELATED APPLICATIONS

The present invention is related to the subject matter of commonly assigned, U.S. Pat. No. 6,112,215 entitled "Database of Repetitively Used Data Entries Displayable for Selection and Entry on a Variety of User Interactive Interfaces from Sources Independent of Said Database" and filed Sep. 24, 1998. The content of the above-referenced U.S. patent is incorporated herein by reference.

BACKGROUND OF THE INVENTION

1. Technical Field

The present invention relates in general to language support in data processing systems and in particular to support for complex languages in data processing systems having limited storage resources. Still more particularly, the present invention relates to enabling tier-0 devices to utilize and display bidirectional and DBCS languages.

2. Description of the Related Art

Tier-0 data processing systems, also referred to as "palm top" computers, personal digital assistants (PDAs), or personal communications assistants (PCAs) and including, for instance, the "Palm Pilot" line of personal digital assistants typically have limited storage resources. Therefore, most existing tier-0 devices provide no support for complex language input due to the large resource requirements for the required dictionaries and fonts.

The Unicode (ISO-10646) character set, as defined by the Unicode Consortium, is finding increasingly widespread implementation, particularly for data intended to be transmitted or distributed over the Internet, such as World Wide Web (WWW) pages. Encoded representations of characters in the Unicode character set are fixed at two bytes in length (double byte characters), with a variable-width encoding known as "UTF-8" (8-bit Unicode Transformation Format) available which may vary from one to three bytes in length. Bidirectional languages such as Hebrew, which may be written either from right-to-left or from left-to-right, employ characters which may have a different appearance depending on the direction in which the text is written. Because of the limitations described above, tier-0 devices typically cannot support Unicode character sets or bidirectional languages.

The lack of support for bidirectional and/or double byte character set (DBCS) languages in tier-0 devices is a serious limitation on the usefulness of such devices. Character sets for languages other than the native language of the host system are not supported, which prevents certain data from being utilized or displayed. Some vendors have created specialized national language versions of their products, but this merely requires additional resources for implementation while failing to provide multilingual support.

It would be desirable, therefore, to provide a method and apparatus for supporting bidirectional, DBCS, or other complex languages in a tier-0 device.

SUMMARY OF THE INVENTION

It is therefore one object of the present invention to provide an improved method and apparatus for language support in data processing systems.

It is another object of the present invention to provide a method and apparatus for supporting complex languages in data processing systems having limited storage resources.

It is yet another object of the present invention to provide a method and apparatus enabling tier-0 devices to utilize and display bidirectional and DBCS languages.

The foregoing objects are achieved as is now described. Complex languages such as bidirectional or double byte character set (e.g., Unicode) languages are supported in tier-0 devices despite the limited storage resources common for such devices. A phrase dictionary is built within a host data processing system which is capable of communicating with the tier-0 device and which supports complex language input. Commonly used text strings are added to the phrase dictionary utilizing any characters. The contents of tis the phrase dictionary are then transferred, along with sparse font information containing only the glyphs necessary for characters within the phrase dictionary, to the tier-0 device. Since font information for only a subset of all possible characters is stored in the tier-0 device, a much smaller amount of storage resources are consumed. On the tier-0 device, the phrase dictionary is invoked by a user control such as a pop-up, and the desired phrase may then be selected for entry into a data entry field. Additional phrases may be added as needed to the phrase dictionary on the host system and the phrase dictionary within the tier-0 device updated to add the new contents and associated sparse font information, if necessary. Multilingual support is therefore enabled in the tier-0 device with minimal consumption of resources.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
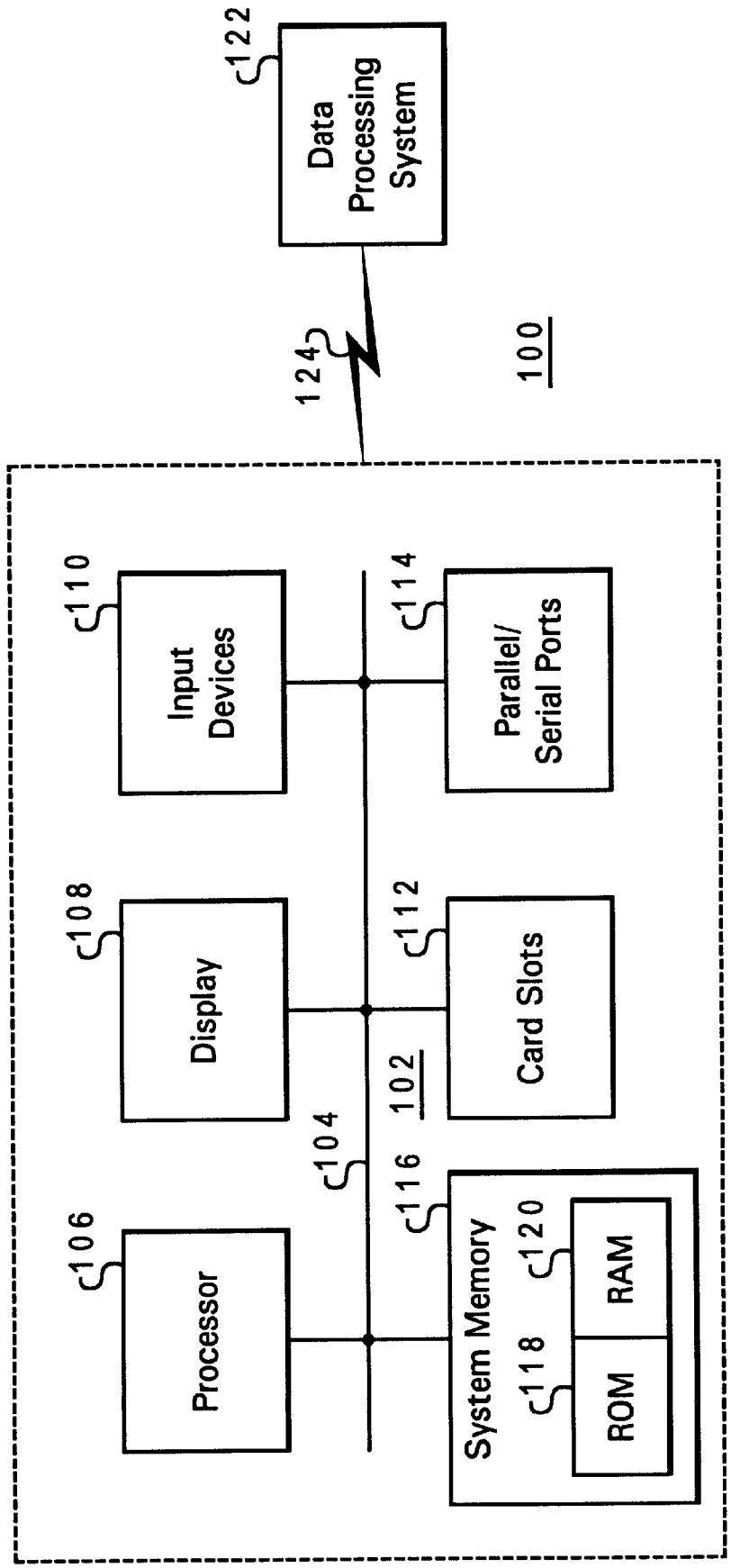
FIG. 1 depicts a block diagram of a data processing system network in which a preferred embodiment of the present invention.

With reference now to the figures, and in particular with reference to FIG. 1, a block diagram of a data processing system network in which a preferred embodiment of the present invention may be implemented. Data processing system network 100 includes a tier-0 data processing system 102, which in turn includes a bus 104 connecting processor 106, display 108, and input devices 110 such as a pen or buttons. Bus 104 of the tier-0 data processing system 102 may be attached to card slots 112 for connecting peripheral devices, parallel and/or serial ports 114, and any other suitable hardware. Bus 104 is also connected to memory 116, which may include read-only memory (ROM) 118 and random access memory (RAM) 120.

The operation of tier-0 data processing systems is well-known in the art. An small operating system such as the Windows CE operating system available from Microsoft Corporation of Redmond, Wash. is stored in memory 116 and control operations of the tier-0 data processing system 102 including input by a user and display of a user interface on display 108. Additionally, the operating system provides functionality supporting communications of tier-0 data processing system 102 with another data processing system 122 via communications link 124.

Data processing system 122 may be a desktop data processing system such as one of the Aptiva™ models of personal computers available from International Business Machines Corporation or Armonk, N.Y. Communications link 124 may be through a wired connections from parallel and/or serial ports 114, or a wireless (e.g., infra-red) connection.

Those skilled in the art will recognize that numerous variants—both of configuration and type—of the components depicted are possible. All such variants are believed to be embraced within the spirit and scope of the present invention. The exemplary embodiment provided is employed solely to illustrate and describe the present invention, and is not intended to imply architectural limitations. However, tier-0 data processing system 102 and data processing system 122 include the functionality described below for entering bidirectional and DBCS languages in tier-0 devices.

Figure 2:
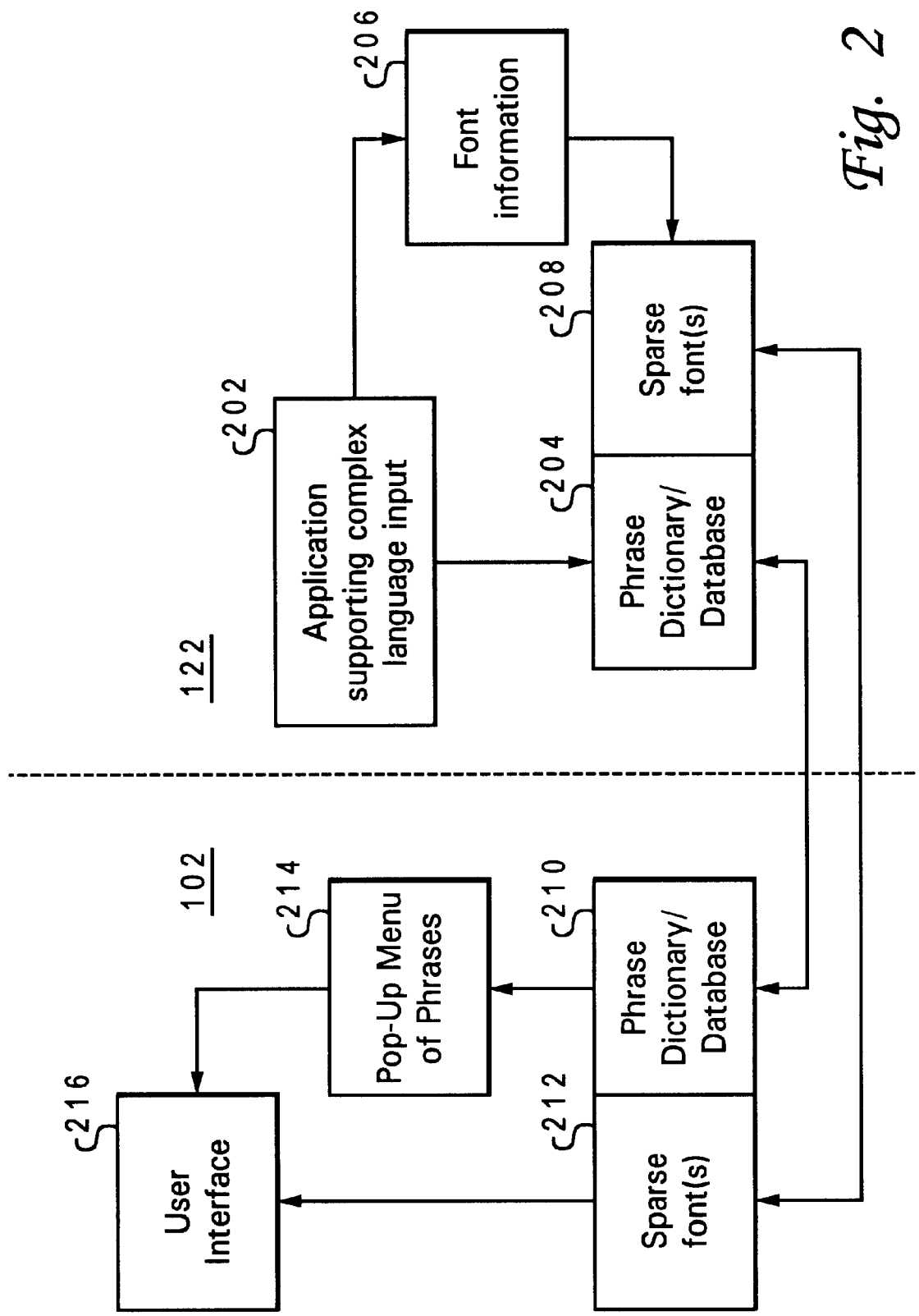
FIG. 2 is a data flow diagram of a method for entering complex, bidirectional and DBCS language text in a tier-0 device in accordance with a preferred embodiment of the present invention.

Referring to FIG. 2, a data flow diagram of a method for entering bidirectional and DBCS languages in a tier-0 device in accordance with a preferred embodiment of the present invention is illustrated. In the present invention, an application 202 executed within host data processing system 122 allows a user to create a customized phrase dictionary 204 for entering commonly utilized text strings. The application 202 may be specifically designed for adding text strings to dictionary 204, or may be a more general word processing application including an export function for export marked phrase to dictionary 204.

In either situation, application 202 includes support for complex languages, such as bidirectional languages and DBCS languages, and host data processing system 122 includes the storage resources for the appropriate character sets and font information 206. The user may thus create a phrase dictionary 204 on host data processing system 122 which contains their commonly utilized text strings, including characters from any language. Techniques for forming a phrase dictionary/database 204 are available to those skilled in the art, and are described, for example, in the related application cited above. The data within phrase dictionary 204 is preferably encoded in UTF-8 to permit easy migration of the dictionary contents across devices which do not directly support complex languages (e.g., Unicode).

At the same time a new phrase is added to phrase dictionary 204, a sparse font is also created if necessary from font information 206 and saved in a sparse font resource 208 associated with phrase dictionary 204. The sparse font resource contains only the glyphs necessary for those characters which are contained within phrase dictionary 204. The appropriate glyphs may be extracted from font information 206 for each unique character within phrase dictionary 204 in accordance with the known art, and saved in sparse font resource 208.

Phrase dictionary 204 and sparse font resource 208 are then copied from host data processing system 122 to tier-0 data processing system 102 via a communications link between the two data processing systems 102 and 122. The copies are saved as phrase dictionary 210 and sparse font resource 212 within tier-0 data processing system 102. Updates may be periodically performed by the user to add additional text strings and any necessary associated sparse font information to phrase dictionary 210 and sparse font resource 212 within tier-0 data processing system 102.

Optionally, phrase dictionary 204 and sparse font resource 208 maynot everbe stored in any nonvolatile memory within host data processing system 122. Phrases may be exported directly from application 202 to phrase dictionary 210 within tier-0 data processing system 102, accompanied by sparse font information for sparse font resource 212. However, phrase dictionary 204 and sparse font resource 208 are preferably first created and maintained within host data processing system 122, with a utility provided within host data processing system 122 or tier-0 data processing system 102 for copying and/or updating the contents of phrase dictionary 204 and sparse font resource 208 to phrase dictionary 210 and sparse font resource 212 within tier-0 data processing system 102.

Within tier-0 device 102, phrase dictionary 210 may be invoked by a user via a pop-up control (not shown) to cause a pop-up display 214 containing a menu of all phrases within phrase dictionary 210. The user may then select a phrase 23D from those available for entry into a data entry field of the user interface 216 of tier-0 data processing system 102. Sparse font information for characters within any phrase selected is available from sparse font resource 212 for user interface 216.

Figure 3:
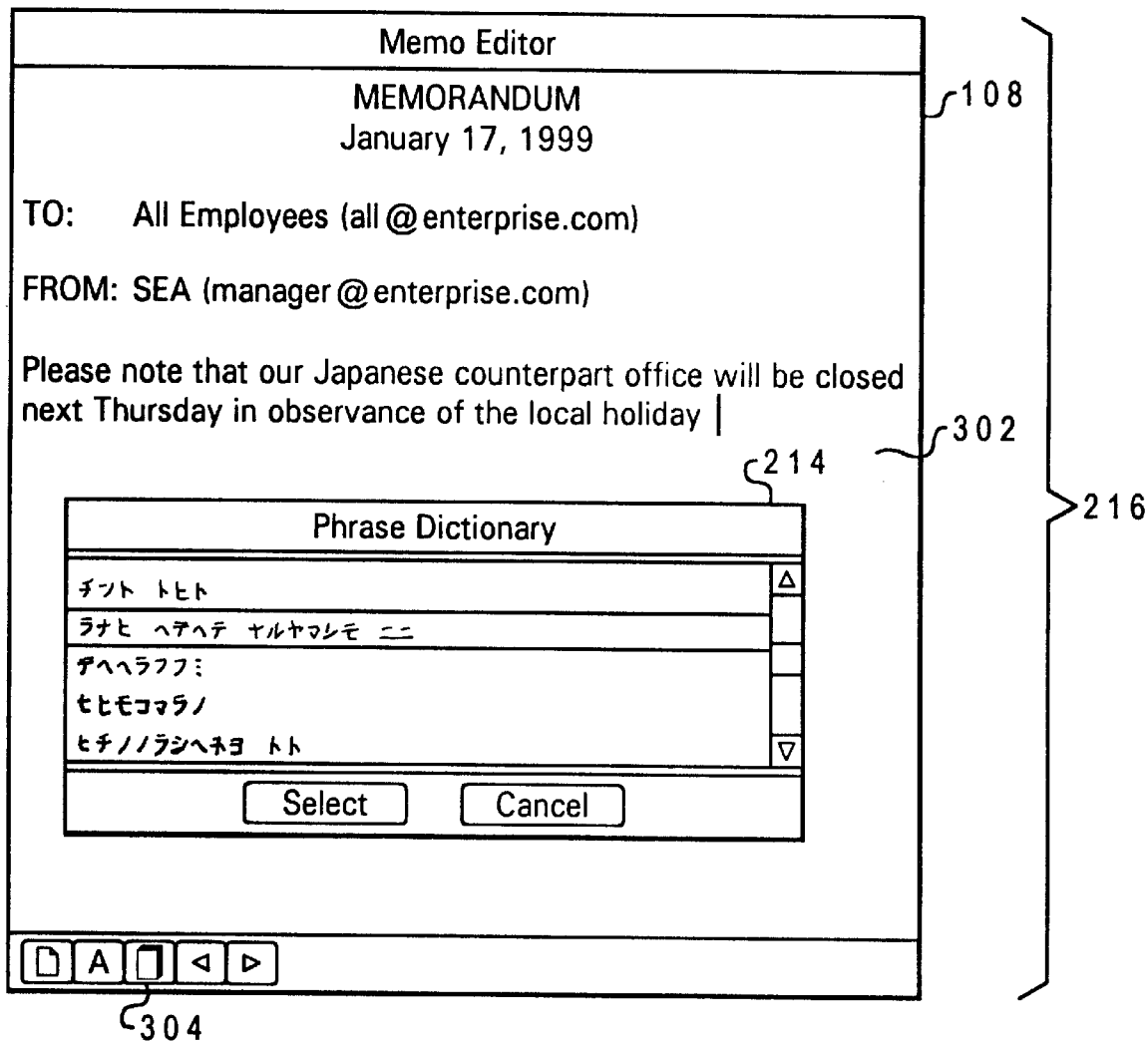
FIG. 3 depicts a pictorial representation of a tier-0 data processing system user interface employing a phrase dictionary to enter and display complex language text in accordance with a preferred embodiment of the present invention.

With reference now to FIG. 3, a pictorial representation of a tier-0 data processing system user interface employing a phrase dictionary to enter and display complex language text in accordance with a preferred embodiment of the present invention is depicted. User interface 216 is displayed within display 108 of tier-0 data processing system 102. User interface 216 includes data entry space 302 into which text may be entered by a user.

User interface 216 also includes phrase dictionary pop-up control 304 allowing a user to selectively invoke display of the phrase dictionary contents. Upon actuation of control 304, the pop-up display 214 for the contents of the phrase dictionary is superimposed or "floated" on top of user interface 216. Pop-up display 214 contains ascrollable menu of available phrases in the example shown. The user may select a desired phrase and enter that phrase into the data entry space 302 of user interface 216.

Figure 4:
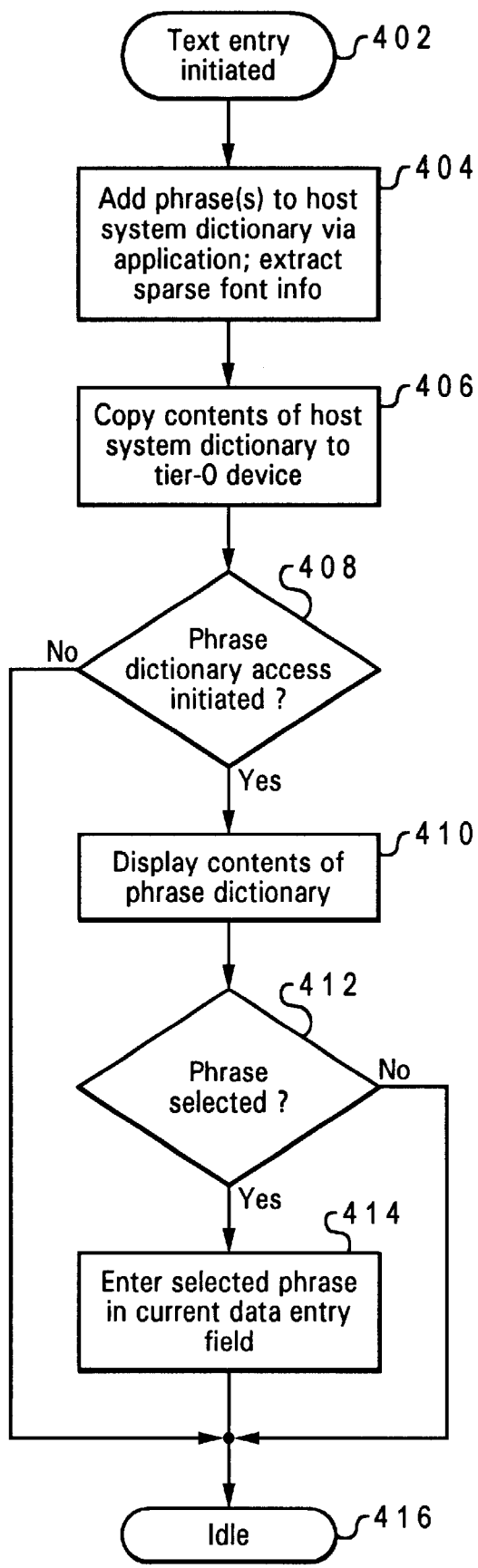
FIG. 4 is a high level flowchart for a process of entering and displaying complex language text in a tier-0 device in accordance with a preferred embodiment of the present invention.

Referring to FIG. 4, a high level flowchart for a process of entering and displaying complex language text in a tier-0 device in accordance with a preferred embodiment of the present invention is illustrated. The process begins at step 402, which depicts complex text entry being initiated. the process next passes to step 404, which illustrates adding phrases to a host system phrase dictionary utilizing an application having facilities for inserting phrases in the phrase dictionary, and extracting any sparse font information necessary to support new characters added to the phrase dictionary. The phrase dictionary is customized for the user, containing user-selected phrases.

The process then passes to step 406, which depicts copying the newly-added contents in the phrase dictionary on the host system to a phrase dictionary within the tier-0 device, together with any associated, necessary sparse font information. This step may optionally be performed automatically and transparently to the user each time the tier-0 device is coupled to a host system to exchange, retrieve or update data.

The process passes next to step 408, which illustrates a determination of whether the user has initiated access to the phrase dictionary within the tier-0 device, such as by actuating a pop-up control as described earlier. If not, the process proceeds to step 416, which illustrates the process becoming idle until complex language text entry is again initiated. If so, however, the process proceeds instead to step 410, which depicts displaying the contents of the phrase dictionary within the user interface of the tier-0 device.

The process next passes to step 412, which illustrates a determination of whether a phrase has been selected by a user from the phrase dictionary. If not, the process proceeds to step 416, described above. If so, however, the process proceeds instead to step 414, which depicts entering the selected phrase in a current data entry field within the user interface of the tier-0 device. The process then passes to step 416, which illustrates the process becoming idle until complex data entry is again initiated.

The process described above may vary, or be performed as several discrete but related processes. For instance, the addition of user-selected phrases to the host system phrase dictionary may be entirely separate from copying the contents of the host system phrase dictionary to the tier-0 device phrase dictionary and from the insertion of a selected phrase from the tier-0 phrase dictionary into a current data entry field within the tier-0 device user interface.

The present invention allows support for complex language data entry in tier-0 devices which might otherwise not be viable due to the large resource requirements normally associated with dictionaries and fonts for complex language support. By limiting the phrase dictionary support to only user-selected phrases and the font support to only those glyphs necessary for each unique character within the phrase dictionary, the resource requirements may be drastically reduced. The present invention thus does not require specialized language versions of a tier-0 product to be created, and enables multilingual input with limited resource usage.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of entering complex language text within a tier-0 device, comprising:

providing a comprehensive complex language input resource in communicative contact with a host system;

forming a customized phrase dictionary within the host system, the phrase dictionary including characters input from the comprehensive complex language input resource for at least one complex language text phrase selected by a user;

transmitting the phrase dictionary to the tier-0 device; and upon user selection of a complex language text phrase from the phrase dictionary in a user interface for the tier-0 device, entering the selected complex language text phrase within a current data entry field in the user interface.

2. The method of claim 1, wherein the step of forming a customized phrase dictionary within a host system further comprises:

entering a plurality of complex language text phrases in the phrase dictionary, wherein each text phrase within the phrase dictionary may be displayed to a user for selection;

extracting sparse font information containing only glyphs necessary for each unique complex language character forming part of at least one text phrase within the phrase dictionary; and transmitting the extracted sparse font information along with the phrase dictionary to the tier-0 device.

3. The method of claim 1, wherein the step of transmitting the phrase dictionary to the tier-0 device further comprises:

transmitting each text phrase within the phrase dictionary to the tier-0 device; and transmitting sparse font information for each unique complex language character forming part of at least one text phrase within the phrase dictionary.

4. The method of claim 1, further comprising:

providing a control within the user interface of the tier-0 device for invoking display of text phrases within the phrase dictionary.

5. A method of providing entry of complex language text into a data entry space within a tier-0 device, comprising:

providing a comprehensive complex language input resource in communicative contact with a host system;

forming a customized phrase dictionary within the host system, the phrase dictionary including characters input from the comprehensive complex language input resource for at least one complex language text phrase selected by a user;

transmitting the phrase dictionary to the tier-0 device;

providing a user interface control for invoking display of complex language text phrases within the phrase dictionary; and responsive to user selection of a complex language text phrase from a display of complex language text phrases within the phrase dictionary, entering the selected complex language text phrase in the data entry space.

6. The method of claim 5, wherein the step of transmitting the phrase dictionary and the sparse font information to the tier-0 device further comprises:

copying the phrase dictionary from the host system containing complete complex language font information for each character set including one or more characters forming part of any complex language text phrase within the phrase dictionary.

7. The method of claim 5, further comprising:

copying sparse font information containing only glyphs necessary for the characters included within the customized phrase dictionary from a host system containing complete complex language font information for each character set including one or more characters forming part of any complex language text phrase within the phrase dictionary, wherein the copied sparse font information includes only glyphs for each unique character forming part of at least one complex language text phrase within the phrase dictionary.

8. The method of claim 5, wherein the step of providing a user interface control for invoking display of complex language text phrases within the phrase dictionary further comprises:

displaying a user interface control for invoking display of complex language text phrases within the phrase dictionary within a user interface for the tier-0 device.

9. The method of claim 5, further comprising:

responsive to user actuation of the user interface by control, displaying a list of complex language text phrases within the phrase dictionary within the user interface.

10. A computer program product within a computer usable medium for providing entry of complex language text into a data entry space within a tier-0 device, comprising:

instruction means for providing a comprehensive complex language input resource in communicative contact with a host system;

instruction means for forming a customized phrase dictionary within the host system, the phrase dictionary including characters input from the comprehensive complex language input resource for at least one complex language text phrase selected by a user;

instruction means for extracting sparse font information containing only glyphs necessary for the characters included within the customized phrase dictionary;

instructions for providing a user interface control for invoking display of complex language text phrases within the phrase dictionary; and instructions, responsive to user selection of a complex language text phrase from a display of complex language text phrases within the phrase dictionary, for entering the selected complex language text phrase in the data entry space.

11. The computer program product of claim 10, further comprising:

instructions for copying the phrase dictionary from a host system containing complete complex language font information for each character set including one or more characters forming part of any complex language text phrase within the phrase dictionary.

12. The computer program product of claim 11, wherein the instructions for forming a customized phrase dictionary containing selected complex language text phrases further comprise:

instructions for copying additions to the phrase dictionary from the host system.

13. The computer program product of claim 10, further comprising instructions for providing complex language font information only for each unique character forming part of at least one complex language text phrase within the phrase dictionary, wherein said instructions for providing complex language font information includes instructions for copying sparse font information from a host system containing complete complex language font information for each character set including one or more characters forming part of any complex language text phrase within the phrase dictionary, wherein the copied sparse font information includes only glyphs for each unique character forming part of at least one complex language text phrase within the phrase dictionary.

14. The computer program product of claim 10, wherein the instructions for providing a user interface control for invoking display of complex language text phrases within the phrase dictionary further comprises:

instructions for displaying a user interface control for invoking display of complex language text phrases within the phrase dictionary within a user interface for the tier-0 device.

15. The computer program product of claim 10, further comprising:

instructions, responsive to user actuation of the user interface control, for displaying a list of complex language text phrases within the phrase dictionary within the user interface.

16. A system for entering complex language text into a data entry space within a tier-0 device, comprising:

processing means for providing a comprehensive complex language input resource in communicative contact with a host system;

processing means for forming a customized phrase dictionary within the host system, the phrase dictionary including characters input from the comprehensive complex language input resource for at least one complex language text phrase selected by a user;

processing means for extracting sparse font information containing only glyphs necessary for the characters included within the customized phrase dictionary;

means for transmitting the phrase dictionary and the sparse font information to the tier-0 device;

processing means for providing a user interface control for invoking display of complex language text phrases within the phrase dictionary; and processing means responsive to user selection of a complex language text phrase from a display of complex language text phrases within the phrase dictionary for entering the selected complex language text phrase in the data entry space.

17. The system of claim 16, wherein the processing means for transmitting the phrase dictionary and the sparse font information to the tier-0 device further comprises:

processing means for copying the phrase dictionary from the host system containing complete complex language font information for each character set including one or more characters forming part of any complex language text phrase within the phrase dictionary.

18. The system of claim 16, further comprising:

processing means for copying sparse font information from a host system containing complete complex language font information for each character set including one or more characters forming part of any complex language text phrase within the phrase dictionary, wherein the copied sparse font information includes only glyphs for each unique character forming part of at least one complex language text phrase within the phrase dictionary.

19. The system of claim 16, wherein the processing means for providing a user interface control for invoking display of complex language text phrases within the phrase dictionary further comprises:

processing means for displaying a user interface control for invoking display of complex language text phrases within the phrase dictionary within a user interface for the tier-0 device.

20. The system of claim 16, further comprising:

processing means responsive to user actuation of the user interface control for displaying a list of complex language text phrases within the phrase dictionary within the user interface.

* * * * *

UNITED STATES PATENT AND TRADEMARK OFFICE
CERTIFICATE OF CORRECTION

PATENT NO. : 6,393,416 B1
DATED : May 21, 2002
INVENTOR(S) : Atkin et al.

It is certified that error appears in the above-identified patent and that said Letters Patent is hereby corrected as shown below:

Column 4,
Line 12, please delete "maynot everbe" and add -- may not ever be --;

Column 7,
Line 16, pleae delete "by".

Signed and Sealed this

Twenty-seventh Day of August, 2002

*Attest:*

*Attesting Officer*

JAMES E. ROGAN
*Director of the United States Patent and Trademark Office*